United States Patent
Cosma et al.

(10) Patent No.: US 9,984,107 B2
(45) Date of Patent: *May 29, 2018

(54) DATABASE JOINS USING UNCERTAIN CRITERIA

(71) Applicant: International Business Machines Corporation, Armonk, NY (US)

(72) Inventors: Marius Cosma, Ottawa (CA); Yandu S. Oppacher, Ottawa (CA); Craig A. Statchuk, Kars (CA)

(73) Assignee: International Business Machines Corporation, Armonk, NY (US)

(*) Notice: Subject to any disclaimer, the term of this patent is extended or adjusted under 35 U.S.C. 154(b) by 512 days.

This patent is subject to a terminal disclaimer.

(21) Appl. No.: 14/574,801

(22) Filed: Dec. 18, 2014

(65) Prior Publication Data

US 2016/0179857 A1 Jun. 23, 2016

(51) Int. Cl.
*G06F 17/30* (2006.01)

(52) U.S. Cl.
CPC .. *G06F 17/30336* (2013.01); *G06F 17/30312* (2013.01); *G06F 17/30498* (2013.01); *G06F 17/30569* (2013.01); *G06F 17/30864* (2013.01)

(58) Field of Classification Search
CPC ........ G06F 17/30336; G06F 17/30312; G06F 17/30498; G06F 17/30569; G06F 17/30846
See application file for complete search history.

(56) References Cited

U.S. PATENT DOCUMENTS

| 7,827,125 | B1* | 11/2010 | Rennison | G06F 17/3066 |
| | | | | 706/14 |
| 7,849,049 | B2 | 12/2010 | Langseth et al. | |
| 2003/0033275 | A1* | 2/2003 | Alpha | G06F 17/30321 |
| 2005/0216421 | A1* | 9/2005 | Barry | G06F 11/0709 |
| | | | | 705/64 |
| 2006/0129593 | A1* | 6/2006 | Slovak | G06F 17/30616 |

(Continued)

FOREIGN PATENT DOCUMENTS

| WO | 2007098320 A2 | 8/2007 |
| WO | 2012125166 A1 | 9/2012 |

OTHER PUBLICATIONS

Cheng et al., "Efficient Join Processing over Uncertain Data," CIKM'06, Nov. 5-11, 2006, Arlington, Virginia, USA.

(Continued)

*Primary Examiner* — Cam-Y Truong
(74) *Attorney, Agent, or Firm* — L. Jeffrey Kelly (57) ABSTRACT

A system for joining modeled data with new data sources. Modeled tabular data containing categorical and metric data is received. New data containing structured or non-structured data is received. The new data is indexed and data clusters and/or data facets are identified. Data clusters and data facets are also identified within the received modeled data. A textual query from a user is received and semantically indexed into keywords. Data clusters and data facets within the new data are matched to the keywords in the indexed query. Data clusters and data facets within in the modeled data are matched to the keywords in the indexed query. A table is generated containing the modeled data and matching data clusters and data facets from the new data.

5 Claims, 5 Drawing Sheets

(56) References Cited

U.S. PATENT DOCUMENTS

2009/0204569 A1* 8/2009 Bowden ............ G06F 17/30864
2010/0023502 A1* 1/2010 Marlow ............ G06F 17/30864
707/E17.017

OTHER PUBLICATIONS

IBM, "Joining data sources," IBM Tivoli Monitoring, Version 6.2.2, Fix Pack 1, p. 1, http://www-01.ibm.com/support/knowledgecenter/SSTFXA_6.2.2.1/com.ibm.itm.doc_6.2.2fp1/6222/ISVUG_6222127.htm%23existingdatasources, Accessed on Aug. 1, 2014.
Lian et al., "Similarity Join Processing on Uncertain Data Streams," IEEE Transactions on Knowledge and Data Engineering, Nov. 2011, p. 1718-1734, vol. 23, No. 11, IEEE Computer Society.
Vivisimo, "How the Vivísimo Clustering Engine Works," 2003, Vivísimo, Inc., Pittsburgh, PA.
Wikibon, "Combining Unstructured and Structured Data to Deliver Big Data Business Value," Wikibon's Jul. 10, 2012 Research Meeting, Last Updated on Nov 18, 2013, p. 1-5, http://wikibon.org/wiki/v/Combining_Unstructured_and_Structured_Data_to_Deliver_Big_Data_Business_Value, Accessed on Aug. 1, 2014.
Wikipedia, "Morphology (linguistics)," Wikipedia: the Free Encyclopedia, Last Modified on May 8, 2014, p. 1-9, http://en.wikipedia.org/wiki/Morphology_(linguistics), Accessed on Aug. 1, 2014.
Wikipedia, "Stemming," Wikipedia: the Free Encyclopedia, Last Modified on May 28, 2014, p. 1-10, http://en.wikipedia.org/wiki/Stemming, Accessed on Aug. 1, 2014.
IBM: List of IBM Patents or Patent Applications Treated as Related (Appendix P), Jun. 11, 2015, pp. 1-2.
U.S. Appl. No. 14/736,307, filed Jun. 11, 2015 entitled: "Database Joins Using Uncertain Criteria", pp. 1-29.

* cited by examiner

DATABASE JOINS USING UNCERTAIN CRITERIA

BACKGROUND

The present invention relates generally to the field of database management systems and more particularly to formatting data from uncertain sources to join with modeled data.

Database systems rely on various models to define and structure data. A common database model is Structured Query Language or "SQL." SQL processes different types of data using standard methods, for example, Extract Transform Loads or "ETL." In ETL systems, data is extracted from homogeneous or heterogeneous data sources, transformed for storing in the proper format or structure, for querying and analysis purposes, and loaded into the final target. Usually all the three phases execute in parallel due to delays that may be caused by the data extraction. In ETL, while the data is being pulled, another transformation process can execute, process, and prepare received data for loading. When data is loaded into a target the data initiates with or without the completion of the previous phases.

ETL systems commonly integrate data from multiple applications, typically developed and supported by different vendors or hosted on separate computer devices. The disparate systems containing the original data are frequently managed and operated by different users.

Modeling or other annotation of data sources are also used. A common operation for data manipulation is a JOIN operation or "JOIN." A JOIN is a command used in database queries to combine records from two or more tables within a database or received data and data stored in the database. A new combined table is generated for further analysis or stored in memory. A JOIN is a means for combining fields from two tables by using values common to each. For example, the following tables represents employee's names and their department identification, along with department identifications and department names.

| Employee table | |
|---|---|
| Last Name | Department ID |
| Rafferty | 31 |
| Jones | 33 |
| Heisenberg | 33 |
| Robinson | 34 |
| Smith | 34 |

| Department table | |
|---|---|
| Department ID | Department Name |
| 31 | Sales |
| 33 | Engineering |
| 34 | Clerical |
| 35 | Marketing |

Performing a JOIN on the table above will create a table that combines fields from the two source tables by using values common to each, which can be represented by the table below:

| Employee (Last Name) | Employee (Department ID) | Department (Department Name) | Department (Department ID) |
|---|---|---|---|
| Robinson | 34 | Clerical | 34 |
| Jones | 33 | Engineering | 33 |
| Smith | 34 | Clerical | 34 |
| Heisenberg | 33 | Engineering | 33 |
| Rafferty | 31 | Sales | 31 |

SUMMARY

Embodiments of the present invention disclose a method, computer program product, and system for joining modeled data with new data sources. Modeled data is received which comprises tabular data, containing rows and columns. The received tabular data contains categorical data and metric data. New data is received containing structured or non-structured data. The new data is indexed and data clusters and/or data facets are identified. Data clusters are one or more keywords in the indexed non-structured data and data facets comprise values in the metric data of in the indexed structured data. Data clusters and data facets are also identified within the received modeled data. A textual query from a user is received and semantically indexed into keywords. Data clusters and data facets are matched within the new data to the keywords in the indexed query. Data clusters and data facets within in the modeled data are matched to the keywords in the indexed query. A table is generated containing the modeled data and matching data clusters and data facets from the new data.

DETAILED DESCRIPTION

SQL databases have limitations from a large data set that may need natural language detection or text mining.

Adding new data complexity may lower the efficiency of standard database applications. Connecting new data to existing data though indexing may not be as desirable as indexing must occur at each received query. Processing data may become more time consuming and more resource intensive as the data set increases. Additionally, more knowledge of the data may be needed in order to model larger quantities of data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
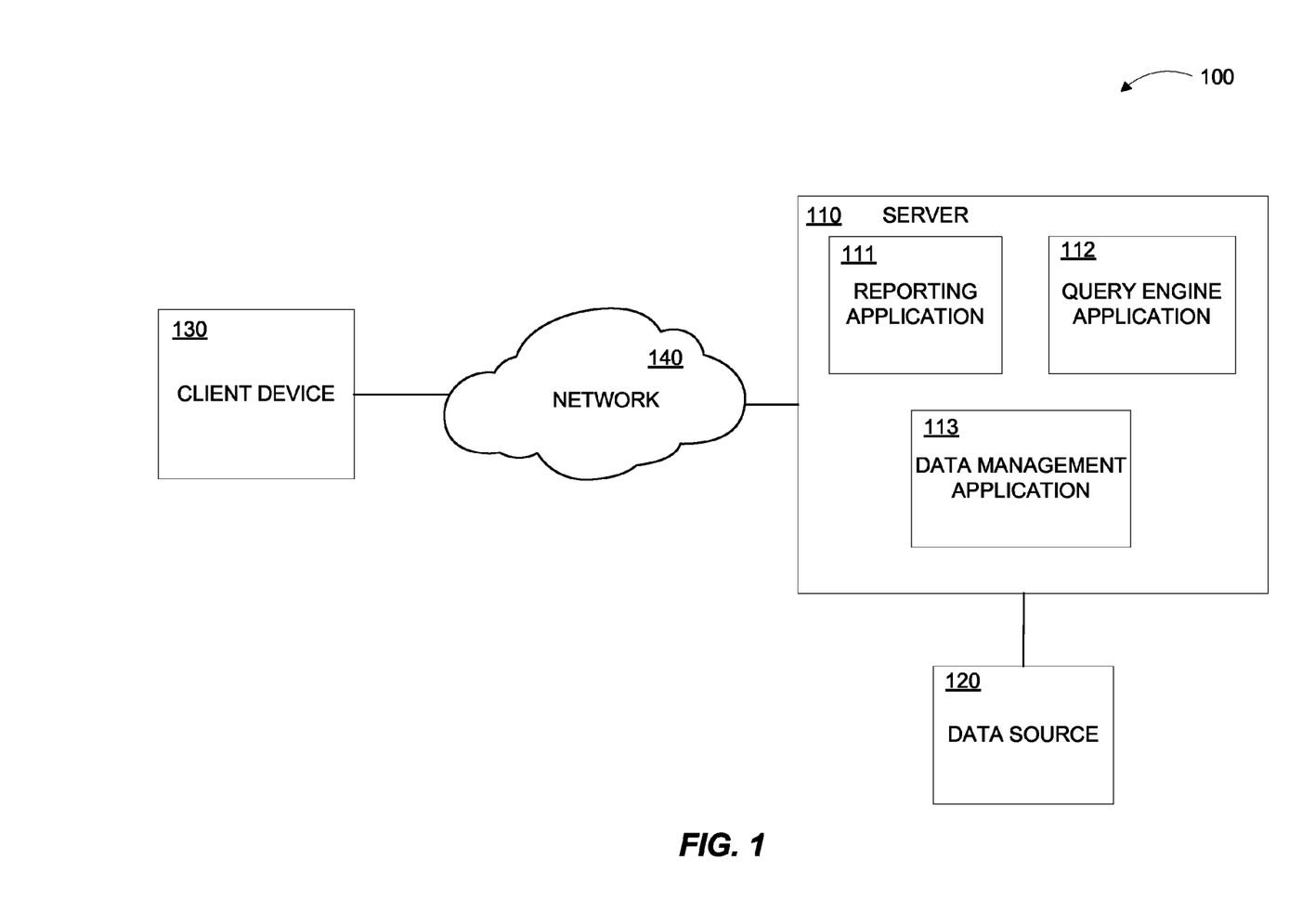
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Data processing environment 100 includes server 110, data source 120, and client device 130, all interconnected over network 140.

Network 140 may include permanent connections, such as wire or fiber optic cables, or temporary connections made through telephone or wireless communications. Network 140 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 140 may also include a number of different types of networks, such as, for example, an intranet, a local area network (LAN), or a wide area network (WAN).

Each of server 110, data source 120, and client device 130 may be a laptop computer, tablet computer, netbook computer, personal computer (PC), a desktop computer, a smart phone, or any programmable electronic device capable of an exchange of data packets with other electronic devices, for example, through a network adapter, in accordance with an embodiment of the invention, and which may be described generally with respect to FIG. 4 below.

Client device 130 may at generally to host applications, send database queries, and receive, store, or send data. Client device 130 may receive input from a user, display data or tables in a GUI, or communicate over a network 140 via, for example, a web browser.

Data source 120 may act generally as an application, device, memory store, or user input device that generates data that is received by Server 110, described below. Data sources can include, for example, current Line of Business (LOB) data, external data sources, or structured data different from the LOB data. LOB data is existing modeled data currently used by the application. LOB data is highly cleansed, organized, normalized and relevant to a typical LOB data user. LOB data represents modeled data and may be in tabular data format containing rows and columns. LOB tables may contain categorical data and metric data. LOB data may be the data other data sources are joined to. Another data source may be non-structured data or semi-structured data from an external data source. External data may provide a variety of data sources not available under typical extract transfer load (ETL) methods of data. Other data sources may include new structured data from an internal or external data source. Structured new data may include data from a different LOB than the original modeled LOB data used regularly. New structured data may not be modeled in the same way as the modeled LOB described above. Keys or other metadata characteristics, for example, cardinality, may differ.

Server 110 includes reporting application 111, query engine application 112, and data management application 113 which are described below in reference to FIG. 2. In various embodiments of the invention, server 110 operates generally to host a server application, for example, reporting application 111, and may receive and send data, for example, send and receive query related data from client device 130. In various embodiments, query engine application 112, which may be separate from reporting application 111, may receive data from data management application 113, described below, index received data, model received data, generate a joined table from source data and received data, communicate the joined table to reporting application 111, or store the joined table in memory. Source data may be data that is already stored on server 110 or data that is previously modeled data that is ready for analysis. Received data or "new data" may be structured data, for example tabular data, or unstructured data, for example, textual data from a social media post.

Reporting application 111 may act generally to receive queries from a user, for example client device 130, receive joined tables from query engine application 112, and graphically display joined tables, using a graphical user interface (GUI), resulting from the input query. Reporting application 111 may receive an input from a user, for example, client device 130. In an embodiment of the invention an input from client device 130 may be a selection of a data source on a GUI displayed by reporting application 111.

Figure 2:
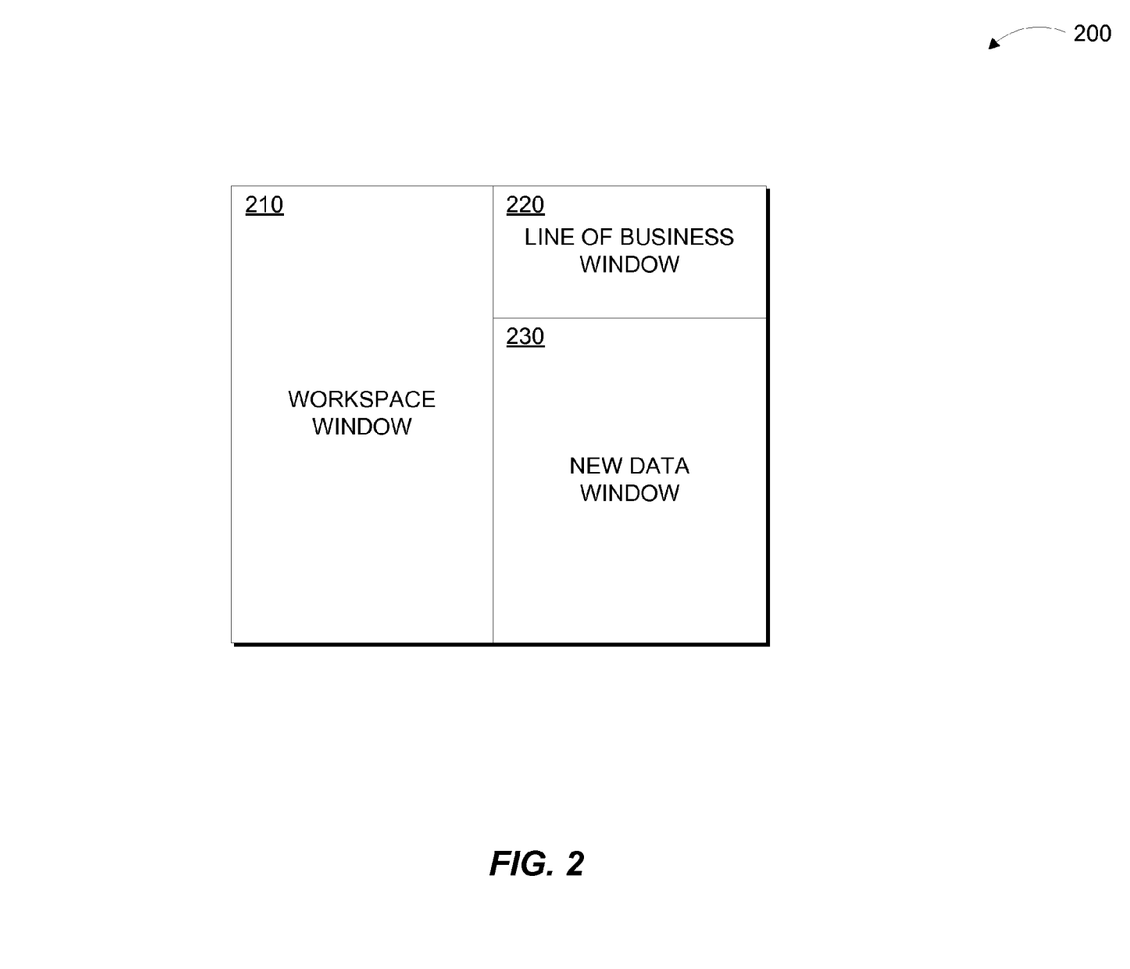
FIG. 2 depicts a block diagram illustrating a graphical user interface, in accordance with an embodiment of the invention

FIG. 2 depicts a block diagram illustrating a graphical user interface that may be utilized by reporting application 111, in accordance with an embodiment of the invention. The GUI 200 displayed by reporting application 111 may be separated into palette windows containing a workspace window 210, a line of business (LOB) window 220, and a new data window 230.

Reporting application 111 may receive an input from client device 130, for example, a mouse click, selecting a modeled data set displayed in LOB window 220. The selected data set may be dragged into the area within workspace window 210. Reporting application 111 may receive a second input selecting another data set, for example, from new data window 230. The selected new data set may be dragged into the area within workspace window 210 and reporting application 111 may query engine application to JOIN the two selected data sets. If the criteria to JOIN the two data sets is not determined, for example, the JOIN criteria does not meet a predetermined probabilistic threshold, reporting application 111 may return a message to the user with selectable options to refine the JOIN criteria. The selected option may be stored in memory and used as the preferred criteria for a similar JOIN operation by the user.

Data management application 113, which may be separate from reporting application 111 and query engine application 112, may receive structured or unstructured data from a data source, for example data source 120. Data management application 113 may index source data and/or received data (collectively "indexed data") and communicate indexed data to query engine application 112, described below. Data management application 113 may store received queries, source data, received data, or indexed data in a data store in memory or communicate indexed data to reporting application 111 or query engine application 112.

In various embodiments, query engine application 112 may act generally to receive and send data, index received data, model received data, generate a joined table from source data and received data, communicate the joined table to reporting application 111, or store the joined table in memory. Data may be received from data management application 113, via data source 120, or another server or device. In various embodiments of the invention, query engine application 112 may include a full text search engine. The full text search engine may have a graphical user interface that enables access to source data and received data (see FIG. 2). Various embodiments of query engine application 112 may employ various search engine methods, including but not limited to, word match, term stemming, morphology, and/or clustering. With a search engine, query engine application 112 may perform JOIN operations on received data that may modeled the same as, or different from, the source data. A JOIN operation may be a typical tabular data JOIN or a "virtual JOIN."

Figure 3:
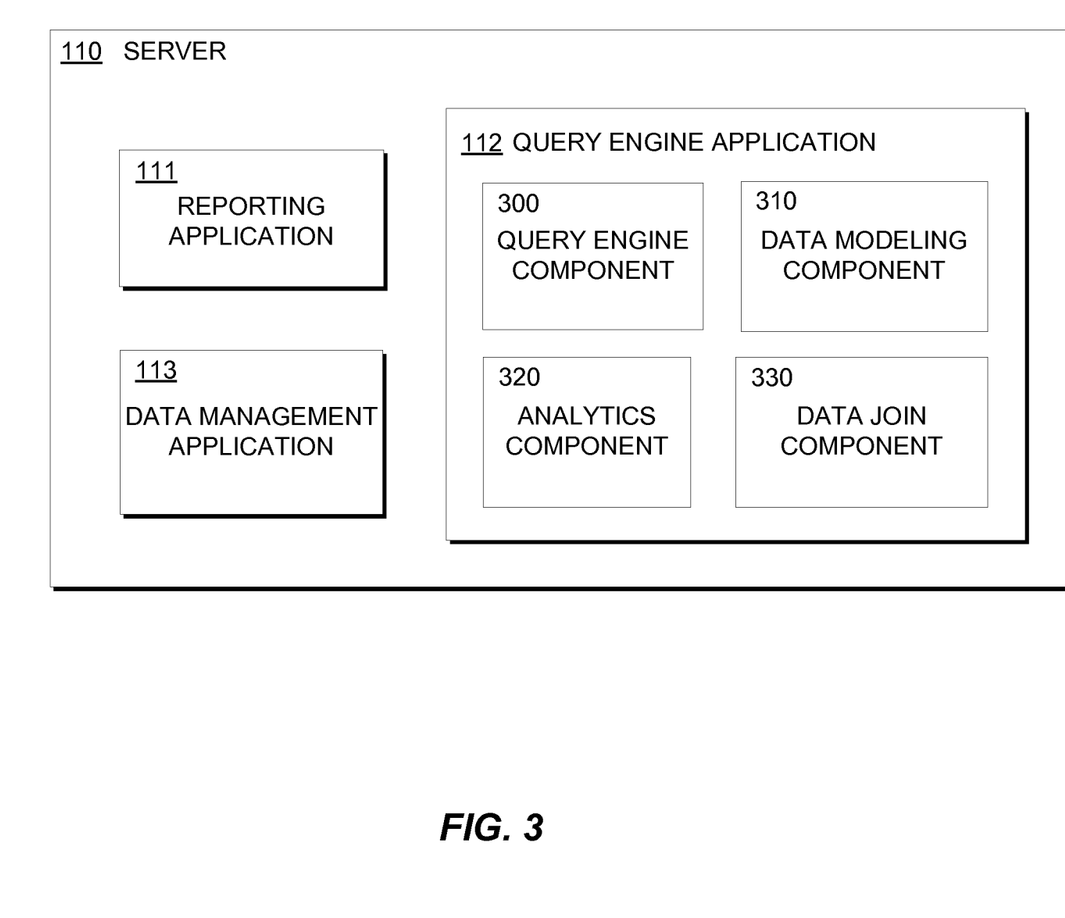
FIG. 3 is a functional block diagram illustrating the components of a server application, in accordance with an embodiment of the present invention.

FIG. 3 is a functional block diagram illustrating the components of query engine 112, in accordance with an embodiment of the present invention. Query engine 112 includes query engine component 300, data modeling component 310, analytics component 320, and data join component 330.

Query engine component 300 may receive a user query. A user query may be an input, described above in reference to reporting application 111, or a textual data request for information relating to modeled and un-modeled data. Query engine component 300 may use semantic analysis to parse the query into keywords within the textual data of the received query. Query engine component 300 may communicate parsed query keywords to data modeling component 310.

Data modeling component 310 may receive source data, received data or indexed data, and identify data clusters and data facets within indexed data. Data clusters are keywords within received data, that may not be structured, that are identified after the received data is indexed. Data facets are values within the columns of received data that may be structured, and are identified as indexed metric data. Data modeling component 310 may index data from a data source, for example data management application 113. Using semantic analysis or a search engine, data modeling component 310 may identify a set of data clusters in the indexed data or a set of data facets in the indexed data. For example, IBM Data Explorer® contains functionality that generates searchable content which is typically exposed as "other sources" in an application, for example, Cagnos Report Studio®. If the data is indexed, as indexing may be a requirement for searchable data, a full text search may provide a faster query response when finding filtered collections of rows in the source or received data. Result search times may not increase as the size of the dataset of source and received data increases, which may be desirable in the industry. Data modeling component 310 may communicate data clusters, data facets, and query keywords to analytics component 320. All brand names and/or trademarks used herein are the property of their respective owners.

Analytics component 320 may act generally to match data clusters, data facets, and query keywords, and communicate the resulting matching data to data join component 330. Analytics component 320 may use semantic analysis or probabilistic searching to identify matching data clusters and data facets with keywords of the query. In various embodiments, analytics component 320 may match values in a column of source data with the one of more values within indexed structured received data columns. With column values of structured data indexed, analytics component 320 may use a search engine to resolve matches between the source data and the received data columns.

Analytics component 320 may use a search engine for data cluster or data facet searches. In various embodiments of the invention, analytics component 320 may use data clusters to identify matching values for the received query keywords. Analytics component 320 may assign numerical values or use a weighted value system to determine the most probable match to a query keyword. Multiple related terms in the data cluster may raise the value or increase the weight of a matching data cluster. When indexed data is grouped with its associated words in a new column, un-structured data may be searchable and matches can be performed between semantically-related terms (keywords and data clusters). In various embodiments of the invention, analytics component 320 may perform a search of the data facets. Analytics component 320 may use semantic searches to associate different values in structured data that may have matching semantic meanings. This may enable analytics component 320 to match data facets to received query keywords that may not be exact but semantically equivalent.

As an example of an embodiment, the following table contains company names and industry descriptors that analytics component 320 may use to determine the data facets in the industry column associated with IBM as semantically "computers" by associating "Software" and "Semi-conductor Manufacturing" with the computer industry. Therefore IBM may be semantically associated with "computers." Likewise company name "GM" may be associated with industry "vehicles" as "Trucks" and "Sedans" may be semantically equivalent to "vehicles." Generating data clusters and data facets may allow analytics component 320 to match relevant data clusters and data facets with query keywords and communicate matches to data join component 330. For example, a received natural language query of "Which company is involved with computers?" may return a result of "IBM" as "IBM" is associated with the computer industry semantically.

| Company Name | Industry |
| --- | --- |
| IBM | Software |
| IBM | Semi-conductor Manufacturing |
| GM | Trucks |
| GM | Sedans |

Data join component 330 may generate tabular results based on a matching received query keywords and associated data clusters and data facets. In various embodiments of the invention, data join component 330 may generate a table using a JOIN function, or search matching, comprising source data and matching data clusters and data facets from within the indexed data that match to keywords in the received query. Data join component 330 may communicate tabular results to reporting application 111.

Reporting application 111 may receive input from a user that the communicated table constitutes a desired result in response to the query. The communicated table may be saved by reporting application 111. Reporting application 111 may receive input that the results are not desirable and the communicated table may be deleted. Reporting application 111 may query data join component 330 for another set of matching results. Reporting application 111 may display one or more options to the user to select form. The options may be based on the matches with less weight or probability that were not used in the initial table generation by data join component 330. Reporting application 111 may receive input form a user indicating a selection of one or more of the displayed options, determining the new criteria to generate a new table. Reporting application 111 may query data join component 330 for a new table based on the selected option. Data join component 330 may generate a new table based on the received selected option from the user via reporting application 111.

Figure 4:
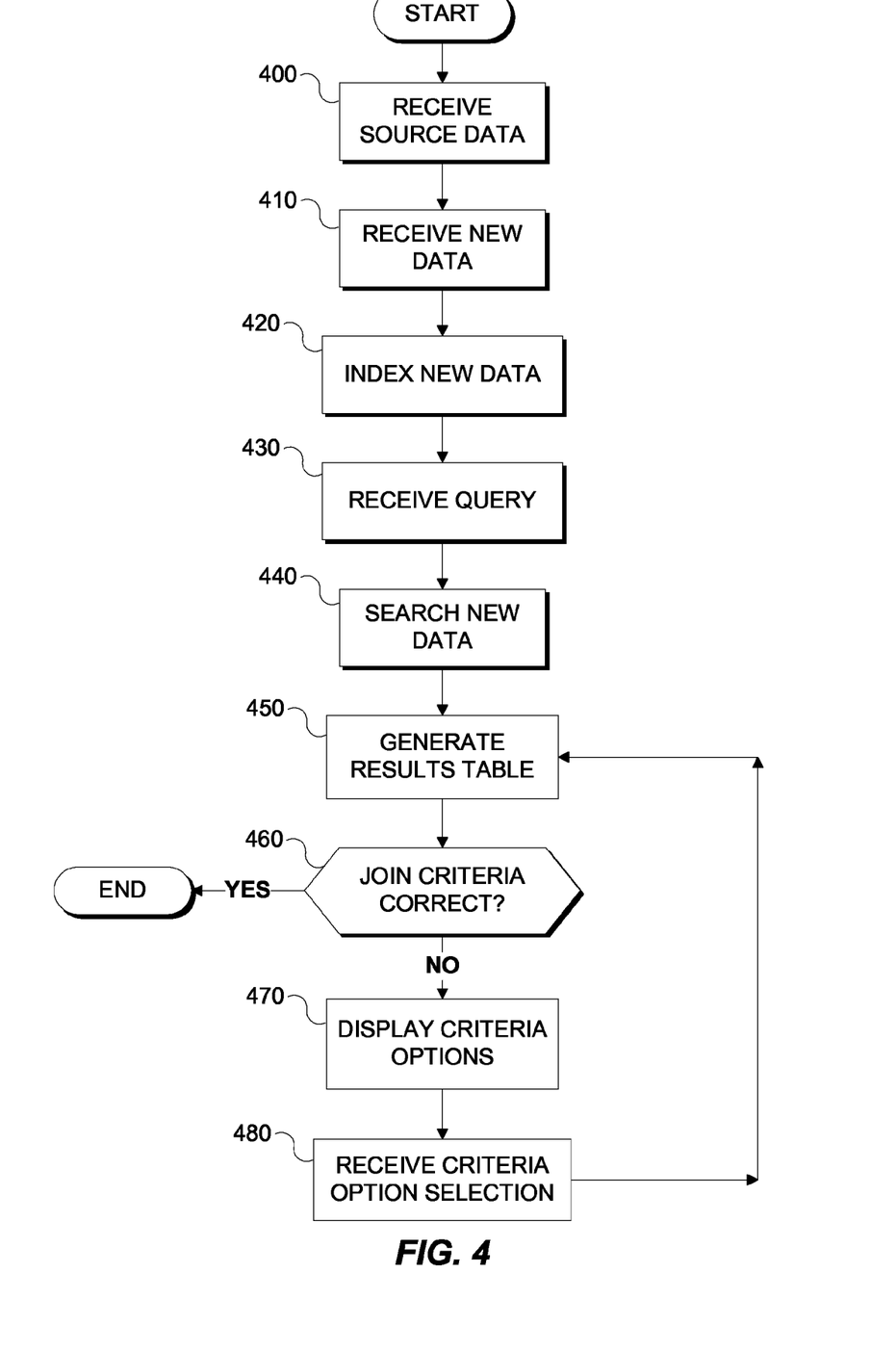
FIG. 4 is a flowchart depicting operational steps of a user performing a query and the joining of data with uncertain sources.

FIG. 4 is a flowchart depicting operational steps of a user performing a query and the joining of data with uncertain sources, in accordance with an embodiment of the invention. Referring to FIGS. 1, 2, and 3, data management application 113 receives source data that is modeled (step 400). Data management application 113 receives new data that may be structured or un-structured and is not modeled in the same way as the source data (step 410). Data management application 113 indexes the new data (step 420) and communicates the indexed new data to data modeling component 310 via query engine application 112. Query engine component 300 receives a query (step 430) and indexes the query to parse out keywords. Query engine component 300 communicates query keywords to data modeling component 310.

Data modeling component 310 identifies data clusters and data facets in the indexed new data and communicates the data clusters, data facets, and query keywords to analytics component 320. Analytics component 320 searches the indexed new data (step 440) using the received data clusters and data facets to match data clusters and data facets to query keywords. The matching results are communicated to data join component 330. Data join component 330 generates a table of results (step 450) based on the query keywords and matching data clusters and data facets and communicates the generated table to reporting application 111. Reporting application 111 displays the generated table to a user. Reporting application 111 may receive input indicating that the generated table is accepted (decision step 460 "YES" branch) and end. Reporting application 111 may receive an input indicating that the generated table is not accepted (decision step 460 "NO" branch) and display optional criteria (step 470) based on the matching data clusters and data facets that were not used in generating the first table. Reporting application 111 receives an input selecting an optional criteria (step 480) and communicates the selected optional criteria to data join component 330. Data join component 330 generates a new table based on the selected optional criteria.

Figure 5:
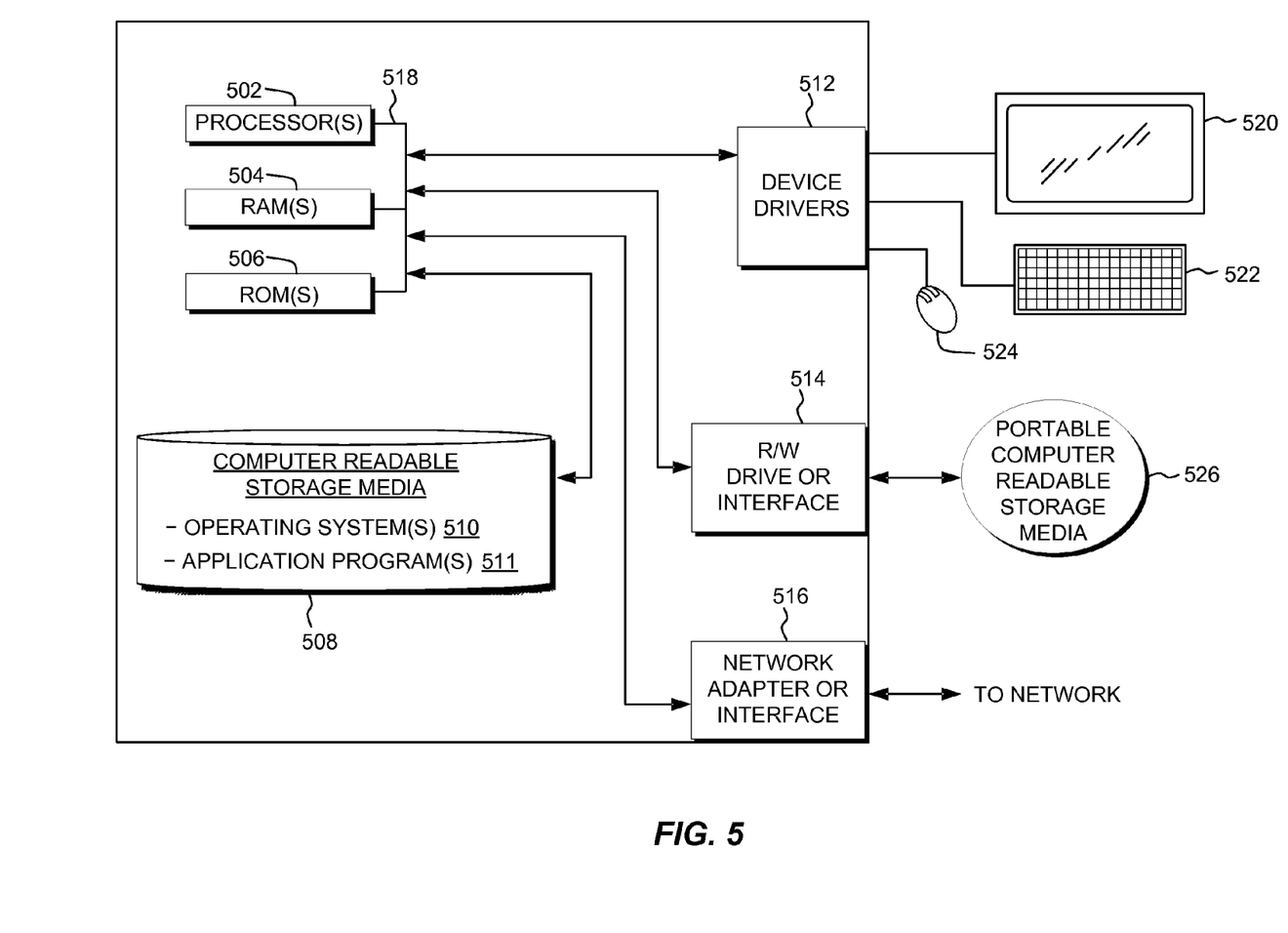
FIG. 5 depicts a block diagram of components of a computing device, in accordance with an embodiment of the present invention.

FIG. 5 depicts a block diagram of components of server 110, data source 120, and client device 130 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Server 110, data source 120, and client device 130 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, reporting application 111, query engine application 112, and data management application 113, are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110, data source 120, and client device 130 may also include a R/W drive or interface 514 to read from and write to one or more portable computer readable storage media 526. Application programs 511 on server 110, data source 120, and client device 130 may be stored on one or more of the portable computer readable storage media 526, read via the respective R/W drive or interface 514 and loaded into the respective computer readable storage media 508.

Server 110, data source 120, and client device 130 may also include a network adapter or interface 516, such as a TCP/IP adapter card or wireless communication adapter (such as a 4G wireless communication adapter using OFDMA technology). Application programs 511 on server 110, data source 120, and client device 130 may be downloaded to the computing device from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Server 110, data source 120, and client device 130 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for joining modeled data and non-modeled data, comprising:

receiving, by a server computer via a network, a set of modeled data and a set of new data comprising one or both of non-structured data and structured data;

indexing, by the server computer, the set of new data, wherein the non-structured data is indexed into data keywords and the structured data is indexed into values of metric data;

identifying, by the server computer, a set of data clusters and a set of data facets of the indexed set of new data using semantic language analysis;

in response to receiving a user query from a user computer via the network, parsing the received user query, using the semantic language analysis, into a plurality of query keywords;

generating, by the server computer, a set of semantically searchable unstructured data based on the user query, wherein the generated set of semantically searchable unstructured data includes at least one data cluster of indexed new data of the identified set of data clusters, wherein the generating the set of searchable unstructured data further comprises associating the indexed set of new data with the plurality of data keywords;

matching, by the server computer, one or more of the data keywords, structured data values, and a modeled data set to the indexed query keywords, using the semantic language analysis, based on at least the set of semantically searchable unstructured data;

generating, via a join operation, a first table based on the matching non-structured data keywords, structured data values, and modeled data to the indexed query keywords;

in response to displaying the generated first table on a graphical user interface of the user computer to a user, displaying, by the server computer, one or more of a set of table options to a user after receiving an input indicating that the generated first table is not accepted, wherein the table options comprise matching data clusters and data facets that were not used to generate the first table, wherein the table options further are based on matches with less weight or probability that were not used in the first table generation by the join operation;

receiving, from a user, an input selecting one or more of the set of displayed table options;

generating a second table, via the join operation, based on the user selected table options; and communicating, by the server computer via the network, the generated second table to the user computer.

2. The method of claim 1, further comprising: communicating the generated first table to a user; and receiving an input from the user wherein the generated first table is saved.

3. The method of claim 1, wherein non-structured data includes one or more of: electronic textual data; electronic tabular data; and electronic social media posts.

4. The method of claim 1, wherein modeled data comprises of tabular data.

5. The method of claim 1, wherein the user query comprises of textual data.

* * * * *